United States Patent [19]

Toppel

[11] Patent Number: 5,160,355
[45] Date of Patent: Nov. 3, 1992

[54] ADSORBENT VESSEL HAVING A CONVECTIVE HEAT EXCHANGER AND FLOW DEVELOPER

[75] Inventor: Karl O. Toppel, Flemington, N.J.

[73] Assignee: The BOC Group, Inc., Murray Hill, N.J.

[21] Appl. No.: 765,609

[22] Filed: Sep. 25, 1991

[51] Int. Cl.$^5$ ............................................ B01D 53/04
[52] U.S. Cl. ...................... 55/269; 55/208; 55/387; 55/418
[58] Field of Search ............... 55/25, 26, 75, 161–163, 55/179, 180, 267, 269, 387, 389, 418

[56] References Cited

U.S. PATENT DOCUMENTS

| | | | |
|---|---|---|---|
| 3,734,293 | 5/1973 | Biskis | 55/179 X |
| 3,735,563 | 5/1973 | Adams | 55/179 |
| 3,800,507 | 4/1974 | Howell et al. | 55/179 X |
| 3,917,458 | 11/1975 | Polak | 55/267 X |
| 4,162,146 | 7/1979 | Seibert | 55/179 X |
| 4,312,640 | 1/1982 | Verrando | 55/179 X |
| 4,312,641 | 1/1982 | Verrando et al. | 55/179 X |
| 4,322,223 | 3/1982 | Christel, Jr. | 55/179 X |
| 4,388,086 | 6/1983 | Bauer et al. | 55/389 X |
| 4,541,851 | 9/1985 | Bosquain et al. | 55/208 |
| 4,552,570 | 11/1985 | Gravatt | 55/179 X |

FOREIGN PATENT DOCUMENTS

| | | | |
|---|---|---|---|
| 1-299622 | 12/1989 | Japan | 55/179 |
| 7610120 | 3/1978 | Netherlands | 55/208 |

*Primary Examiner*—Robert Spitzer
*Attorney, Agent, or Firm*—David M. Rosenblum; Larry R. Cassett

[57] ABSTRACT

The present invention provides an adsorbent vessel adapted to contain an adsorbent and form an adsorbent bed for use in adsorbing a component of a multicomponent gas mixture during a pressure swing adsorption process. In accordance with such process the adsorbent bed is regenerated by desorbing the adsorbed component. The adsorption capacity of the adsorbent decreases with decreasing temperature and the pressure swing adsorption process produces a cold spot of reduced temperature within a region of the adsorbent bed. In order to combat the resulting decreased adsorption capacity, a convective heat exchanger extends into the cold spot to raise the temperature of the cold spot. The convective heat exchanger is provided with at least two passes for the entering multi-component gas mixture or the outward bound desorbed component to transverse and thereby transfer heat to the cold spot. Additionally, the heat exchanger can also serve to supply a sufficiently long straight run for the entering multi-component gas mixture to fully develop. The full development of the entering flow prevents unequal distribution of the multi-component gas mixture within the adsorbent bed.

16 Claims, 2 Drawing Sheets

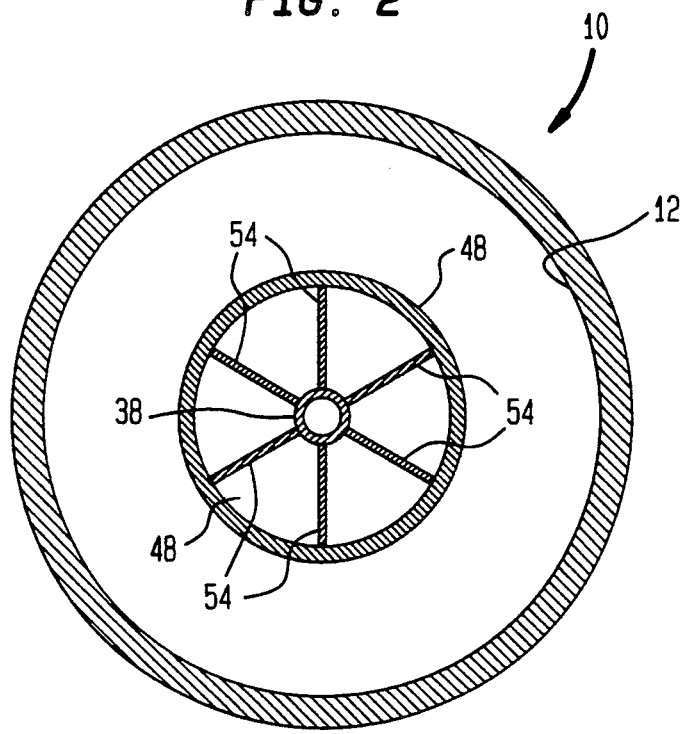

ADSORBENT VESSEL HAVING A CONVECTIVE HEAT EXCHANGER AND FLOW DEVELOPER

BACKGROUND OF THE INVENTION

The present invention relates to an adsorbent vessel containing an adsorbent to form an adsorbent bed for use in a pressure swing adsorption process wherein a cold spot forms in the adsorbent bed and/or flow to the adsorbent bed is not fully developed. More particularly, the present invention relates to such an adsorbent vessel in which a convective heat exchanger is located with the adsorbent vessel to raise the temperature of the cold spot and/or to fully develop flow to the adsorbent bed.

Pressure swing adsorption is used to produce a product gas from a multi-component gas mixture by adsorbing a component contained within the gas mixture. In a typical pressure swing adsorption process to generate oxygen, air is passed under pressure into an adsorbent formed of zeolite pellets to adsorb nitrogen and to produce a product gas composed essentially of oxygen. The adsorbent is then regenerated by desorbing nitrogen therefrom. Several interconnected adsorbent vessels containing the adsorbent are ordinarily used in carrying out the pressure swing adsorption process so that the adsorbent vessels can alternately be used to produce product or to regenerate the adsorbent.

Adsorption by the adsorbent is exothermic while desorption of the adsorbent is endothermic. If a pressure swing adsorption process were conducted to thermodynamic perfection, then the heat produced by adsorption could be used in desorption. However, adsorption does not uniformly occur in the adsorbent bed. Additionally, heat is carried away in the product gas and the desorbed gas. As a result, a cold spot forms near an inlet of the adsorption vessel and a hot spot forms near an outlet of the adsorption vessel. The adsorption capacity of some adsorbents such as zeolites, however, decreases with decreasing temperature, and therefore, the effectiveness of the adsorption decreases within the cold spot.

Another possible factor that can decrease the effectiveness of adsorption concerns the flow of the gas mixture into the adsorbent bed. For instance, if a bend or tee fitting is located too close to the inlet of the adsorbent vessel, the flow of the gas mixture will not be fully developed upon its entry into the adsorbent vessel. That is, the flow velocity will vary across the flow of the gas mixture. The disadvantage of this is that the gas mixture will be distributed on an unequal basis within the adsorbent bed and thereby decrease the degree to which the component of the gas mixture is actually adsorbed in the adsorbent bed.

The present invention provides an apparatus that has principal use in increasing the temperature of the cold spot, and therefore, decreasing the deterioration of the adsorbent capacity of the adsorbent due to the cold spot. Additionally, the present invention also provides a compact device to fully develop flow entering an adsorbent bed to insure that the gas to be separated is equally distributed throughout the adsorbent bed.

SUMMARY OF THE INVENTION

The present invention provides an adsorbent vessel for containing an adsorbent to form an adsorbent bed used in a pressure swing adsorption process wherein a component of a multi-component gas mixture is adsorbed to produce a product gas essentially free of the component and the adsorbent bed is regenerated by desorbing the component from the adsorbent bed. The adsorbent has a deteriorating adsorption capacity at a reduced temperature and the pressure swing adsorption process produces a cold spot of the reduced temperature within the adsorbent bed.

The adsorbent vessel has an inlet through which the multi-component gas mixture and the adsorbed component flow, to and from the adsorbent, respectively. At least one elongated, convective heat exchanger, fabricated from a heat conductive material, is located within the adsorbent vessel to extend into the cold spot. The at least one elongated, convective heat exchanger has at least two oppositely directed, lengthwise extending passes in communication with one another and also with the inlet such that the multi-component gas mixture and the desorbed component traverse the at least two oppositely directed passes upon entering and leaving the adsorbent vessel. As a result, heat is transferred from the multi-component gas mixture and the desorbed component to the cold spot to raise cold spot temperature above the reduced temperature. Consequently, the deterioration of the adsorbent capacity of the adsorbent will decrease with the increase in temperature.

In another aspect, the present invention provides an adsorbent vessel for containing an adsorbent to form an adsorbent bed used in a pressure swing adsorption process wherein a component of a multi-component gas mixture is adsorbed to produce a product gas essentially free of the component. The multi-component gas mixture is supplied to the adsorbent vessel under conditions of non-fully developed flow. As a result, the multi-component gas mixture is not uniformly distributed to the adsorbent bed.

The adsorbent vessel has an inlet through which the non-fully developed flow of the multi-component gas mixture enters the adsorbent vessel. In order to cure problems associated with the non-uniform distribution of the multi-component gas mixture, an elongated flow developer is provided. The flow developer is located within the adsorbent vessel and has two oppositely directed, lengthwise extending passes. The two lengthwise extending passes are in communication with one another and the inlet such that the multi-component gas mixture traverses the two passes before entering the interior of the adsorbent vessel. One of the two passes, through which the multi-component gas mixture flows just prior to entering the adsorbent vessel, is configured to provide a straight run having a length sufficient to fully develop the flow of the multi-component gas mixture.

In still another aspect, the present invention provides an adsorbent vessel containing at least one elongated heat exchanger as described above. Such a heat exchanger can be fabricated to also act as a flow developer. In such case, one of the at least two passes, through which the multi-component gas flows just prior to entering the adsorbent vessel, is configured to provide a straight run having a length sufficient to fully develop the flow of the multi-component gas mixture.

BRIEF DESCRIPTION OF THE DRAWINGS

While the specification concludes with claims particularly pointing out the subject matter that Applicant regards as his invention, it is believed that the invention will be better understood from the following description taken in conjunction with the accompanying drawings in which:

FIG. 2 is a sectional view taken along line 2—2 of FIG. 1.

DETAILED DESCRIPTION

Figure 1:
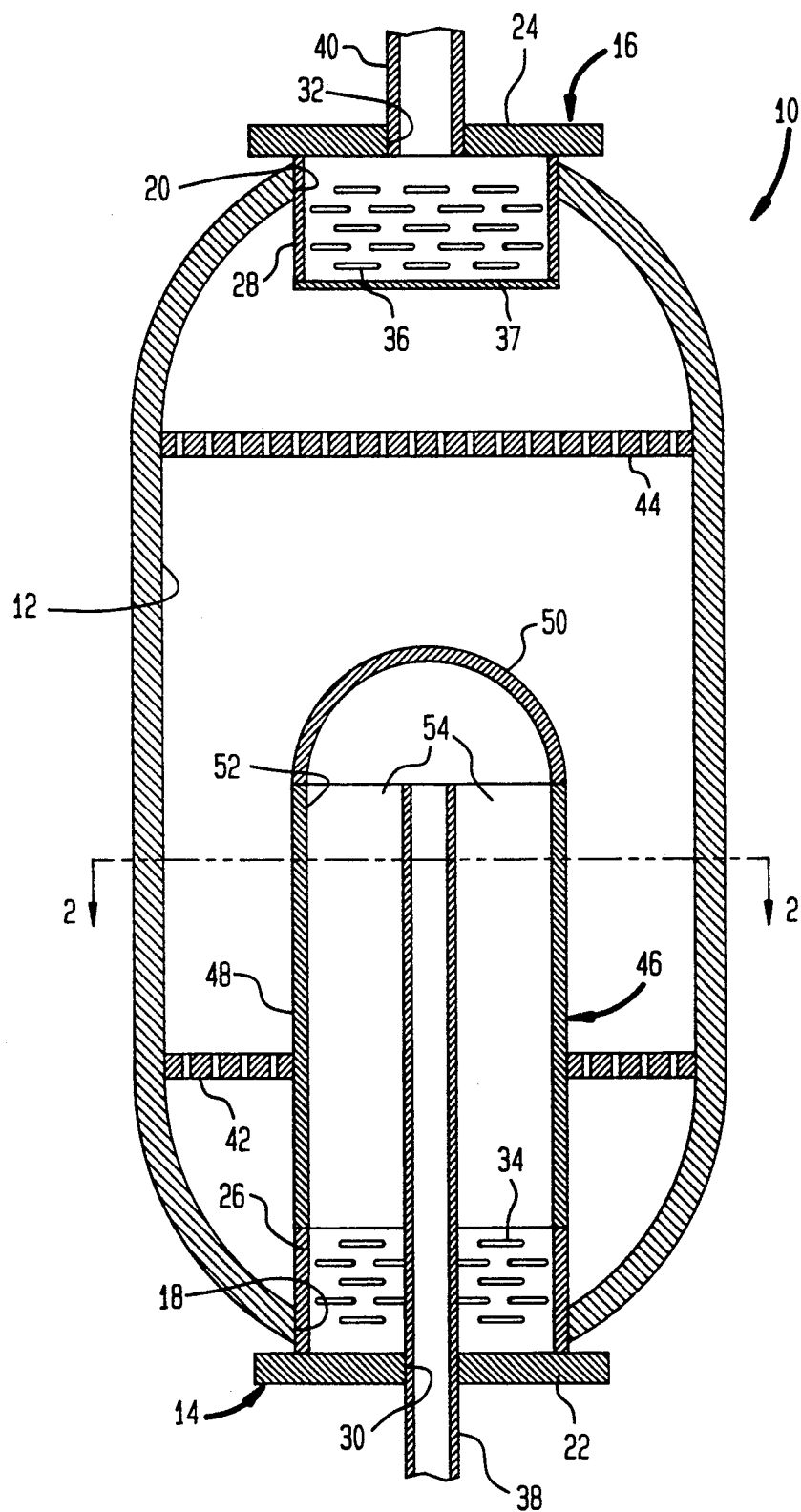
FIG. 1 is a schematic, sectional view of an adsorbent vessel in accordance with the present invention.

With reference to the Figs., an adsorbent vessel 10 in accordance with the present invention is illustrated. Adsorbent vessel 10 has an interior 12 to contain a zeolite adsorbent for use in fractionating oxygen from air. As would be appreciated by those skilled in the art, adsorbent vessel 10 could be shaped wider and flatter than the form illustrated in complete dependence upon process considerations and the amount of adsorbent to be utilized.

A pair of opposed inlet and outlet distributors 14 and 16 are provided at openings 18 and 20 at the ends of adsorbent vessel 10 and are held in place in a manner well known in the art. Both inlet and outlet flow distributors 14 and 16 are provided with end walls 22 and 24 and sidewalls 26 and 28 of cylindrical configuration projecting into openings 18 and 20. End walls 22 and 24 are provided with inlet and outlet openings 30 and 32 defined in end walls 22 and 24 and sidewalls 26 and 28 are provided with a plurality of slit-like apertures 34 and 36. Outlet distributor 16 is provided with an opposed end wall 37 connected to sidewall 28 thereof so that process gasses are constrained to pass through slit-like apertures 36 of sidewall 28. Inlet distributor 14 is not provided with such an opposed end wall and as such constitutes a modified form of a flow distributor for purposes that will become apparent.

Inlet and outlet pipes 38 and 40 pass through inlet and outlet openings 30 and 32 of end walls 22 and 24 and are welded to end walls 22 and 24. Pressurized air enters interior 12 of adsorbent vessel 10 via an inlet pipe 38 for adsorption of nitrogen within the zeolite adsorbent that can be contained within adsorbent vessel 10. The zeolite adsorbent, not illustrated, is contained and supported within adsorbent vessel 10 between perforate supporting structures 42 and 44, well known in the art, that allow passage of the process gases to and from the adsorbent. The perforate supporting structures allow a sufficient volume to be created within interior 12 of adsorbent vessel 10 above and below the zeolite adsorbent to allow for the accumulation and distribution of process gases.

The adsorption of nitrogen within the zeolite adsorbent produces a product oxygen gas essentially free of the nitrogen which is discharged from adsorbent vessel 10 via outlet conduit 40. As would be known to those skilled in the art, additional process streams such as purge, backfill and equalization gases also flow to and from vessel 10 through outlet conduit 40. During regeneration, reduced pressure is applied to inlet conduit 38 to cause adsorbed nitrogen to desorb from the zeolite and be drawn from adsorbent vessel 10 through inlet conduit 38.

As mentioned previously, due to heat of adsorption, a cold spot tends to form within the zeolite contained within adsorbent vessel 10 closer to inlet distributor 16 than to outlet distributor 18. In adsorbent vessel 10, the cold spot exists within the central, lower one third region of the zeolite contained within the vessel. The reduction in temperature of the zeolite within the cold spot decreases the capacity of zeolite to adsorb nitrogen. In the present invention, the cold spot is heated by an elongated, convective heat exchanger 46 fabricated from a heat conductive material, for instance stainless steel. Heat exchanger 46 is located within the adsorbent vessel so as to extend into the cold spot.

Heat exchanger 46 has a reversing flow path for either the air entering interior 12 of adsorbent vessel 10 or desorbed nitrogen passing out of interior 12 of adsorbent vessel 10. Since the air is much warmer than the cold spot, typically 0° C., but as low as −60° C., the reversing path taken by the entering air tends to raise the temperature of the cold spot. Additionally, since desorbed nitrogen is approximately 20° C., a good deal warmer than the cold spot, heat tends to transfer to the cold spot from also the outgoing desorbed nitrogen to raise the temperature of the cold spot, and thus, prevent deterioration of the performance of the zeolite adsorbent.

Convective heat exchanger 46 comprises inlet pipe 38, which is sized to project inwardly and is left open to form an inner tube of heat exchanger 46, an outer tube 48, and an inner end cap 50. Inner end cap 50 is connected to one of the ends of outer tube 48. Outer tube 48 is connected at the other of its ends to cylindrical sidewall 26 of inlet distributor 16. The resulting structure of heat exchanger 46 has two oppositely directed, lengthwise extending passes formed by inlet pipe 38 and an annular flow area 52 formed between inlet pipe 38 and outer tube 48. For instance, air passing through the pass formed by inlet pipe 38 flows toward and into the cold spot to heat the cold spot. The air then reverses direction at inner end cap 50 and then flows through the pass formed by annular flow area 52. The air then flows into inlet distributer 18 and passes into interior 12 of vessel 10 through slit-like apertures 34 thereof. After passage through slit-like apertures 34, the air reverses direction again in its flow to the adsorbent. The desorbed nitrogen flows along a flow path that is the reverse of that taken by the entering air.

The passes are designed to allow heat to be transferred, through the heat conductive material forming elongated heat exchanger 46, to the cold spot from the air or desorbed nitrogen during their transverse of the reversing flow path defined by the two passes. Practically, this is accomplished by appropriately sizing heat exchanger 46 to extend into the cold spot region or slightly past the cold spot region of the adsorbent bed. If necessary, heat exchanger 42 can extend the full length of adsorption vessel 10.

Heat exchanger 46 can serve to fully develop the air flow into adsorbent vessel 10 in the event that such flow is not fully developed. In this regard, it is sometimes necessary to locate tee fittings and bends, through which air flows to the adsorbent vessel, very near the inlet to the adsorbent vessel. As the air flow changes direction around a bend or through a tee fitting, the velocity distribution across the air flow becomes non-uniform or not fully developed. Normally a straight run of six or more pipe diameters are provided after the tee fitting or bend to allow the air flow to fully develop before entering the adsorbent vessel. When this is not or cannot be done because of other design considerations, the non-uniform velocity distribution across the air flow will cause the air to non-uniformly distribute itself in the adsorbent vessel and thus, the adsorbent. As a result, adsorbent will be unequally utilized to decrease the adsorption capability of the adsorption bed.

Convective heat exchanger 46 solves this problem by providing a sufficient straight run of flow for the entering air to fully develop prior to its entry into the adsorbent bed. In this regard, this sufficient straight run is provided by annular flow area 52. In order to decrease the length of annular flow area 52 and hence, heat exchanger 46, required for such a purpose, flow straighteners such as radially extending plates 54 can be provided within annular flow area 52. In place of plates 54, bundles of open ended pipes could be inserted into annular flow area 52.

In the event that in addition to a cold spot problem, a flow development problem, as described above, is inherent in the pressure swing adsorption system design, then heat exchanger can be designed to also fully develop the flow of incoming air. As may be appreciated, heat exchanger 46 can be solely designed to solve flow development problems without regard to potential cold spot problems. In any possible embodiment of or use for heat exchanger 46, the flow areas of annular flow area 52 and inlet pipe 38 should each be no less than the transverse cross-sectional area of process piping to prevent excessive pressure drops in the process piping. In addition to the foregoing, other possible embodiments of the subject invention could include the use of more than one elongated, convective heat exchangers or an elongated convective heat exchanger having more than two passes. The disadvantage of such embodiments would be the increase in pressure drop produced by the additional passes.

While a preferred embodiment of the invention have been shown and described in detail, it will be readily understood and appreciated by those skilled in the art, that numerous omissions, changes and additions may be made without departing from the spirit and scope of the invention.

I claim:

1. In an adsorbent vessel for containing an adsorbent to form an adsorbent bed used in a pressure swing adsorption process wherein a component of a multi-component gas mixture is adsorbed to produce a product gas essentially free of the component, the adsorbent bed is regenerated by desorbing the component from the adsorbent bed, the adsorbent has a deteriorating adsorption capacity at a reduced temperature, and the pressure swing adsorption process produces a cold spot of the reduced temperature within the adsorbent bed, the adsorbent vessel having an inlet through which the multi-component gas mixture and the desorbed component flow, to and from the adsorbent bed, respectively, the improvement comprising:

at least one elongated, convective heat exchanger, fabricated from a heat conductive material, located within the adsorbent vessel so as to extend into the cold spot, and having at least two oppositely directed, lengthwise extending passes;

the at least two oppositely directed, lengthwise extending passes in communication with one another and the inlet such that the multi-component gas mixture and the desorbed component traverse the at least two oppositely directed passes upon entering and leaving the adsorbent vessel and transfer heat to the cold spot and thereby raise cold spot temperature above the reduced temperature and decrease the deterioration of the adsorption capacity of the adsorbent.

2. The improvement of claim 1, wherein the heat exchanger comprises:

an elongated outer tube projecting into the cold spot;
an inner end cap connected to one end of the outer tube; and
an elongated inner tube coaxially extending within the outer tube and sized such that an annular flow area is defined between the inner tube and the outer tube;
one of the at least two passes formed by the annular flow area and the other of the at least two passes formed by the elongated inner tube.

3. The improvement of claim 2, wherein the inner tube and the annular flow area defined between the outer tube and the inner tube have flow areas of no less than process piping of the pressure swing adsorption process.

4. The improvement of claim 3, wherein:
the inner and outer tubes are each of cylindrical configuration; and
the inner end cap is of hemispherical configuration.

5. In an adsorbent vessel for containing an adsorbent to form an adsorbent bed used in a pressure swing adsorption process wherein a component of a multi-component gas mixture is adsorbed to produce a product gas essentially free of the component and the multi-component gas mixture is supplied to the adsorbent vessel under conditions of non-fully developed flow, the adsorbent vessel having, an inlet through which the non-fully developed flow of the multi-component gas mixture enters the adsorbent vessel, the improvement comprising:

an elongated flow developer, located within the adsorbent vessel and having two oppositely directed, lengthwise extending passes in communication with one another and the inlet such that the multi-component gas traverses the two passes before entering the interior of the adsorbent vessel;

one of the two passes, through which the multi-component gas flows just prior to entering the adsorbent vessel, configured to provide an unobstructed straight run having a length sufficient to fully develop the flow of the multi-component gas mixture.

6. The improvement of claim 5, further comprising flow straightening means located within the one of the at least two passes for straightening the flow of the multi-component gas mixture and thereby decreasing the sufficient length that would otherwise be required for the flow of the multi-component gas mixture to fully develop.

7. The improvement of claim 5, wherein the elongated flow developer comprises:
an elongated outer tube;
an inner end cap connected to one end of the outer tube; and
an elongated inner tube coaxially extending within the outer tube and sized such that an annular flow area is defined between the inner tube and the outer tube;
one of the two passes formed by the annular flow area and the other of the two passes formed by the elongated inner tube.

8. The improvement of claim 7, further comprising flow straightening means located within the annular flow area for straightening the flow of the multi-component gas mixture and thereby decreasing the sufficient length that would otherwise be required for the flow of the multi-component gas mixture to fully develop.

9. The improvement of claim 8, wherein the inner tube and the annular area defined between the outer tube and the inner tube have flow areas of no less than process piping of the pressure swing adsorption process.

10. The improvement of claim 9, wherein:

the inner and outer tubes are each of cylindrical configuration; and the inner end cap is of hemispherical configuration.

11. In an adsorbent vessel for containing an adsorbent to form an adsorbent bed used in a pressure swing adsorption process wherein a component of a multi-component gas mixture is adsorbed to produce a product gas essentially free of the component, the adsorbent bed is regenerated by desorbing the component from the adsorbent bed, the adsorbent has a deteriorating adsorption capacity at a reduced temperature, the multi-component gas mixture is supplied to the adsorbent vessel under conditions of non-fully developed flow, and the pressure swing adsorption process produces a cold spot of the reduced temperature within the adsorbent bed, the adsorbent vessel having, an inlet through which the non-fully developed flow of the multi-component gas mixture and the desorbed component flow, to and from the adsorbent bed, respectively, the improvement comprising:

at least one elongated, convective heat exchanger, fabricated from a heat conductive material, located within the adsorbent vessel so as to extend into the cold spot, and having at least two oppositely directed, lengthwise extending passes;

the at least two oppositely directed, lengthwise extending passes in communication with one another and the inlet such that the multi-component gas mixture and the desorbed component traverse the at least two oppositely directed passes upon entering and leaving the adsorbent bed and transfer heat to the cold spot and thereby raise cold spot temperature above the reduced temperature and decrease the deterioration of the adsorbent capacity of the adsorbent; and one of the at least two passes, through which the multi-component gas flows just prior to entering the adsorbent vessel, configured to provide a straight run having a length sufficient to fully develop the flow of the multi-component gas mixture.

12. The improvement of claim 11, further comprising flow straightening means located within the one of the at least two passes for straightening the flow of the multi-component gas mixture and thereby decreasing the sufficient length that would otherwise be required to fully develop the flow of the multi-component gas mixture.

13. The improvement of claim 11, the at least one elongated heat exchanger comprises:

an elongated outer tube projecting into the cold spot;

an inner end cap connected to one end of the outer tube; and an elongated inner tube coaxially extending within the outer tube and sized such that an annular flow area is defined between the inner tube and the outer tube;

one of the at least two passes formed by the annular flow area and the other of the at least two passes formed by the elongated inner tube.

14. The improvement of claim 13, further comprising flow straightening means located within the annular flow area to decrease the sufficient length that would otherwise be required to straighten the flow of the multi-component gas mixture.

15. The improvement of claim 14, wherein the inner tube and the annular area defined between the outer tube and the inner tube have flow areas of no less than process piping of the pressure swing adsorption process.

16. The improvement of claim 15, wherein:

the inner and outer tubes are each of cylindrical configuration; and the inner end cap is of hemispherical configuration.

* * * * *